(12) United States Patent
Noguchi et al.

(10) Patent No.: US 9,793,075 B2
(45) Date of Patent: Oct. 17, 2017

(54) ROTARY INPUT DEVICE

(71) Applicant: Alps Electric Co., Ltd., Tokyo (JP)

(72) Inventors: Takashi Noguchi, Miyagi-ken (JP); Fumihiko Kashiwabara, Miyagi-ken (JP)

(73) Assignee: ALPS ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 15/238,603

(22) Filed: Aug. 16, 2016

(65) Prior Publication Data

US 2017/0069446 A1 Mar. 9, 2017

(30) Foreign Application Priority Data

Sep. 8, 2015 (JP) .................... 2015-176698

(51) Int. Cl.
*H01H 19/58* (2006.01)
*B60Q 1/14* (2006.01)

(52) U.S. Cl.
CPC ......... *H01H 19/585* (2013.01); *B60Q 1/1476* (2013.01)

(58) Field of Classification Search
CPC .... H01H 19/585; H01H 1/5805; H01H 19/08; H01H 11/0056; H01H 19/005; B60Q 1/1476

USPC ............. 200/11 R, 6 R, 11 DA, 11 G, 275; 341/35

See application file for complete search history.

(56) References Cited

U.S. PATENT DOCUMENTS

| | | | | |
|---|---|---|---|---|
| 5,422,448 A | * | 6/1995 | Nakano | G01D 5/25 200/11 DA |
| 2003/0227369 A1 | * | 12/2003 | Terui | H01H 19/585 338/162 |
| 2010/0149001 A1 | * | 6/2010 | Yamanoue | H01H 19/585 341/35 |

FOREIGN PATENT DOCUMENTS

JP 60-48203 U 4/1985

* cited by examiner

*Primary Examiner* — Edwin A. Leon
(74) *Attorney, Agent, or Firm* — Beyer Law Group LLP (57) ABSTRACT

A connection state (conduction/non-conduction) between a slide electrode and a first electrode pattern is switched with a first rotation angle as a boundary, and the switching of the connection state is generated by switching a contact state (contact/non-contact) between a first contact and a first electrode pattern. A connection state between a slide electrode and a second electrode pattern is switched with a third rotation angle as a boundary, and the switching of the connection state is generated by switching a contact state between a first contact and a second electrode pattern. That is, the contact state between the first contact farther away from a rotation center than the second contact and the electrode pattern defines a connection state between the slide electrode and an electrode pattern.

5 Claims, 8 Drawing Sheets

ROTARY INPUT DEVICE

CLAIM OF PRIORITY

This application claims benefit of Japanese Patent Application No. 2015-176698 filed on Sep. 8, 2015, which is hereby incorporated by reference.

BACKGROUND OF THE INVENTION

1. Field of the Invention

The present invention relates to a rotary input device which can be applied to an input operation or the like in a combination switch for a vehicle or various electronic devices.

2. Description of the Related Art

In Japanese Unexamined Utility Model Registration Application Publication No. 60-48203, a rotary type electronic component is disclosed, which uses a substrate on which a plurality of arc-shaped conductive patterns having a common center and diameters different from each other are formed, and a slider which is provided to be rotatable with respect to the substrate and slides on each conductive pattern. Switching between a contact state and a non-contact state between the slider and each conductive pattern is generated according to a rotation angle of the slider, and thus, a signal corresponding to the rotation angle is obtained.

In the above-described rotary type electronic component of the related art, an end edge of the conductive pattern positioned in an innermost diameter region closest to a rotation center of the slider on the substrate is used as a boundary at which connection states between the conductive pattern and the slider are switched. That is, the rotation angle when switching between the contact state and the non-contact state between the slider and the conductive pattern on the end edge of the conductive pattern positioned in the innermost diameter region is generated is set to a rotation angle (hereinafter, referred to as a "switching operation angle") when switching between ON and OFF states is generated according to a rotation input operation.

Meanwhile, as the end edge (hereinafter, referred to as a "connection boundary edge") of the conductive pattern at which the connection states between the conductive pattern and the slider are switched becomes closer to the rotation center of the slider, the requirements for the accuracy of the switching operation angle becomes stricter. That is, errors of the rotation angle converted into a length of a deviation between the slider and conductive pattern increase as the connection boundary edge become closer to the rotation center. Accordingly, it is necessary to set the accuracy of dimensions or disposition of a component according to the connection boundary edge positioned closest to the rotation center. Therefore, in a case where a plurality of rows of conductive patterns are arranged in a radial direction about the rotation center, since a high-level component accuracy is required according to the connection boundary edge of the innermost diameter conductive pattern, there is a problem that a manufacturing cost may increase.

SUMMARY OF THE INVENTION

The present invention provides a rotary input device in which accuracy of a rotation angle is able to be increased when switching between ON and OFF states is generated according to the rotation input operation while reducing a level of accuracy required in dimensions or disposition of a component.

According to an aspect of the present invention, there is provided a rotary input device including: a substrate on which a plurality of electrode patterns are formed; and a slide electrode which includes a plurality of contacts sliding on the plurality of electrode patterns, is held by a rotary member rotating relative to the substrate according to a rotation input operation, and switches connection states between the slide electrode and the plurality of electrode patterns on the plurality of contacts according to rotation of the rotary member. The plurality of electrode patterns includes a first electrode pattern which is connected to the slide electrode via a first contact in the plurality of contacts in a case where a rotation angle of the rotary member in a predetermined direction is within a range from a reference rotation angle to a first rotation angle, and is disconnected from the slide electrode in a case where the rotation angle is within a range in which the rotary member further rotates in the predetermined direction from the first rotation angle, and a second electrode pattern which is connected to the slide electrode via a second contact closer to a rotation center of the rotary member than the first contact among the plurality of contacts in a case where the rotation angle is within a range from the reference rotation angle to a second rotation angle in which the rotary member further rotates in the predetermined direction from the first rotation angle, is connected to the slide electrode via the first contact in a case where the rotation angle is within a range from the second rotation angle to a third rotation angle in which the rotary member further rotates in the predetermined direction from the second rotation angle, and is disconnected from the slide electrode in a case where the rotation angle is within a range in which the rotary member further rotates in the predetermined direction from the third rotation angle.

According to this configuration, the connection states (conduction/non-conduction) between the slide electrode and the first electrode pattern are switched with the first rotation angle as a boundary, and the switching of the connection states is generated by switching the contact states (contact/non-contact) between the first contact and the first electrode pattern. In addition, the connection states (conduction/non-conduction) between the slide electrode and the second electrode pattern are switched with the third rotation angle as a boundary, and the switching of the connection states is generated by switching the contact states (contact/non-contact) between the first contact and the second electrode pattern. That is, the contact state between the first contact positioned farther away from the rotation center than the second contact and the electrode pattern defines the connection state between the slide electrode and the electrode pattern. Accordingly, compared to a case where the contact state between the second contact and the electrode pattern defines the connection state between the slide electrode and the electrode pattern, it is possible to increase the accuracy of the rotation angle when the switching between the ON and the OFF state (connection states between the slide electrode and the electrode pattern) is generated according to the rotation input operation while reducing a level of accuracy required in dimensions or disposition of a component.

Preferably, the second electrode pattern does not comes into contact with the second contact in a case where the rotation angle is within a range in which the rotary member further rotates in the predetermined direction from a fourth rotation angle between the second rotation angle and the third rotation angle.

Accordingly, since the second contact and the second electrode pattern reliably does not come into contact with each other at the third rotation angle, the contact state between the second contact and the second electrode pattern does not influence the switching of the connection state (conduction/non-conduction) between the slide electrode and the second electrode pattern at the third rotation angle. As a result, the contact state between the first contact and the electrode pattern defines the connection state between the slide electrode and the electrode pattern.

Preferably, the first electrode pattern includes a first edge portion which is an end edge on which a contact state between the first edge portion and the first contact is switched in a case where the rotation angle is the first rotation angle. The second electrode pattern may include a second edge portion which is an end edge on which a contact state between the second edge portion and the first contact is switched in a case where the rotation angle is the second rotation angle, a third edge portion which is an end edge on which a contact state between the third edge portion and the first contact is switched in a case where the rotation angle is the third rotation angle, and a fourth edge portion which is an end edge on which a contact state between the fourth edge portion and the second contact is switched in a case where the rotation angle is the fourth rotation angle.

Preferably, the first electrode pattern includes a sliding surface between the first electrode pattern and the sliding surface which is formed in an arc shape with respect to the rotation center, and one end edge in a circumferential direction of the sliding surface forms the first edge portion. The second electrode pattern may include a first electrode portion which includes a sliding surface between the first electrode portion and the first contact which is formed in an arc shape with respect to the rotation center, and in which both end edges on the sliding surface in the circumferential direction form the second edge portion and the third edge portion, a second electrode portion which includes a sliding surface between the second electrode portion and the second contact which is formed in an arc shape with respect to the rotation center, and in which one end edge on the sliding surface in the circumferential direction forms the fourth edge portion, and a connection portion which is electrically connected to the first electrode portion and the second electrode portion.

Preferably, the plurality of electrode patterns include a ground electrode pattern which is connected to the slide electrode via a third contact farther away from the rotation center than the first contact among the plurality of contacts between an initial rotation angle of the rotary member and a final rotation angle thereof.

Accordingly, all the first electrode pattern and the second electrode pattern are within the range from the initial rotation angle to the final rotation angle and the range from the rotation center to the ground electrode pattern in the radial direction. Therefore, it is possible to easily shield the first electrode pattern and the second electrode pattern from electromagnetic noise or electrostatic discharge from the outside by the ground electrode pattern.

BRIEF DESCRIPTION OF THE DRAWINGS

FIGS. 8A to 8D are equivalent circuit diagrams for explaining the functions of the electrode patterns disposed on the substrate, FIG. 8A shows a state where "HEAD LAMP" and "PARK LAMP" are turned off, FIG. 8B shows a state where "HEAD LAMP" is automatically turned on or turned off, FIG. 8C shows a state where "PARK LAMP" is turned on, and FIG. 8D shows a state where "HEAD LAMP" and "PARK LAMP" are turned on.

DESCRIPTION OF THE PREFERRED EMBODIMENTS

Hereinafter, a rotary input device according to an embodiment of the present invention is described.

Figure 1:
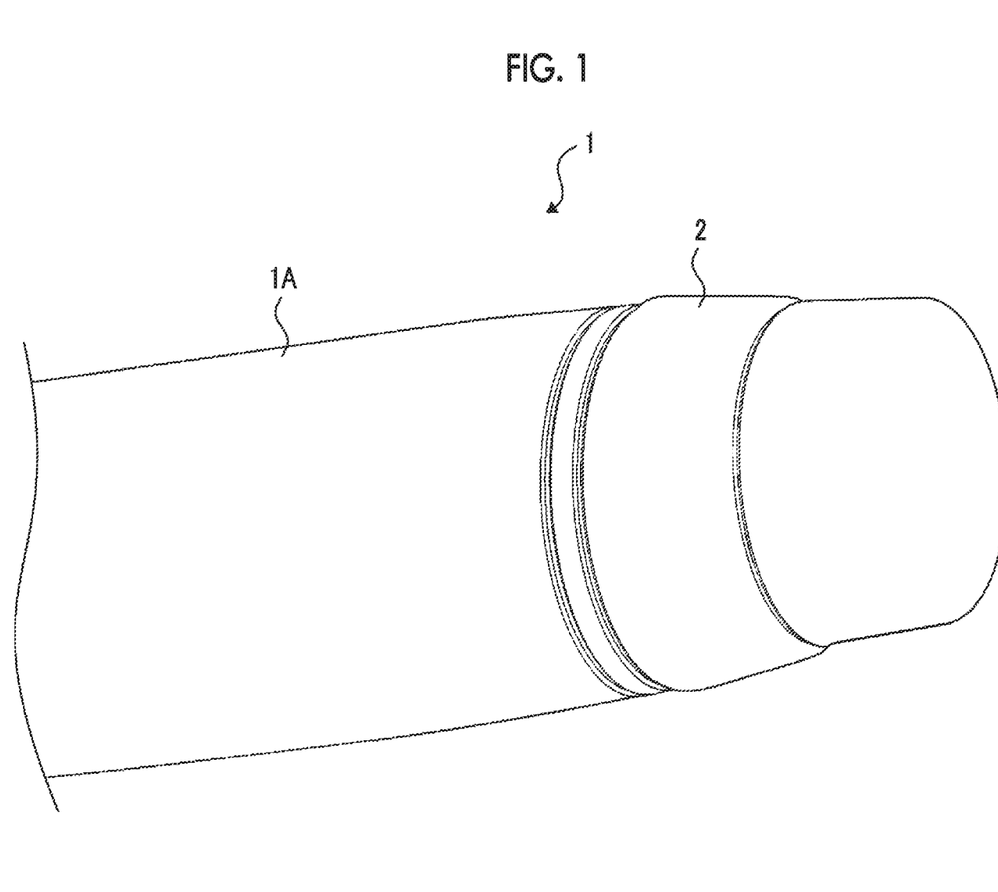
FIG. 1 is an external perspective view of a stalk switch on which a rotary input device according to an embodiment of the present invention is mounted.
Figure 2:
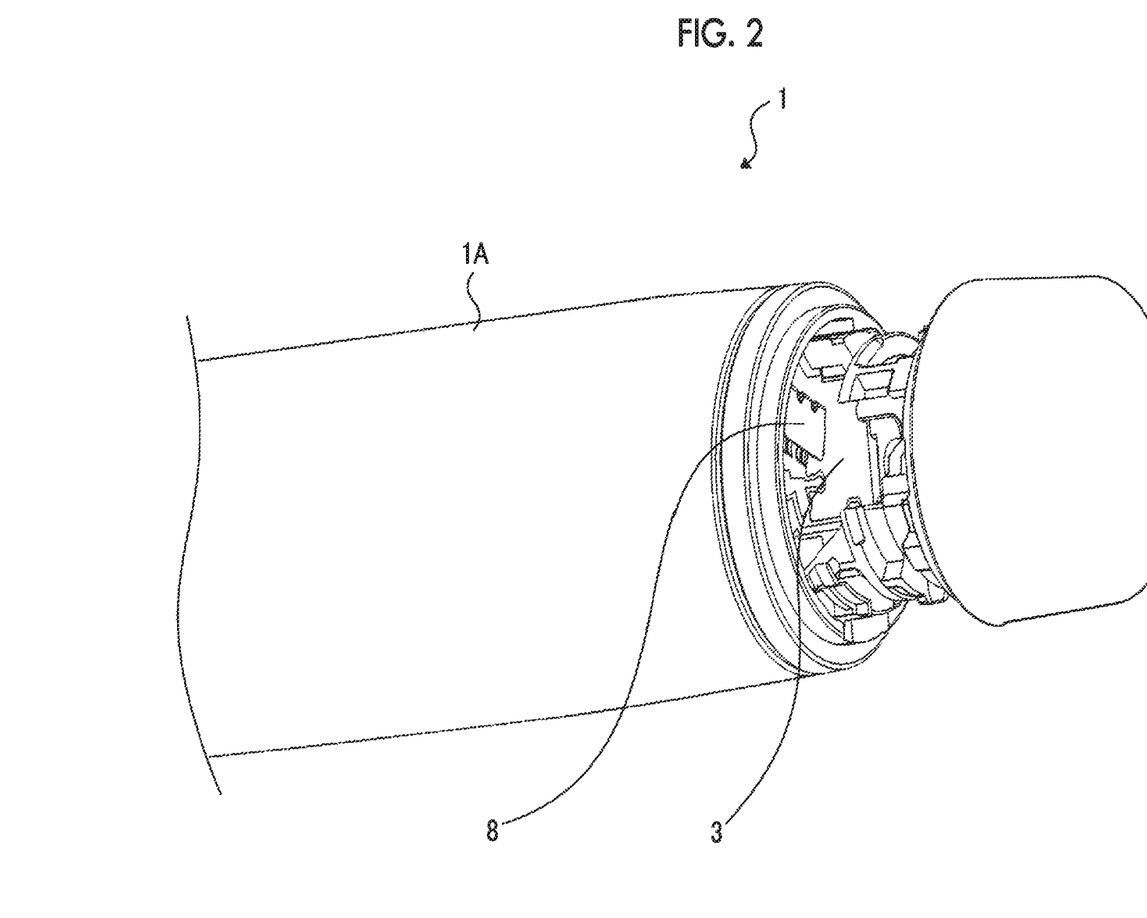
FIG. 2 is an enlarged exploded perspective view showing a substrate and a slide electrode of the rotary input device disposed in the stalk switch.
Figure 3:
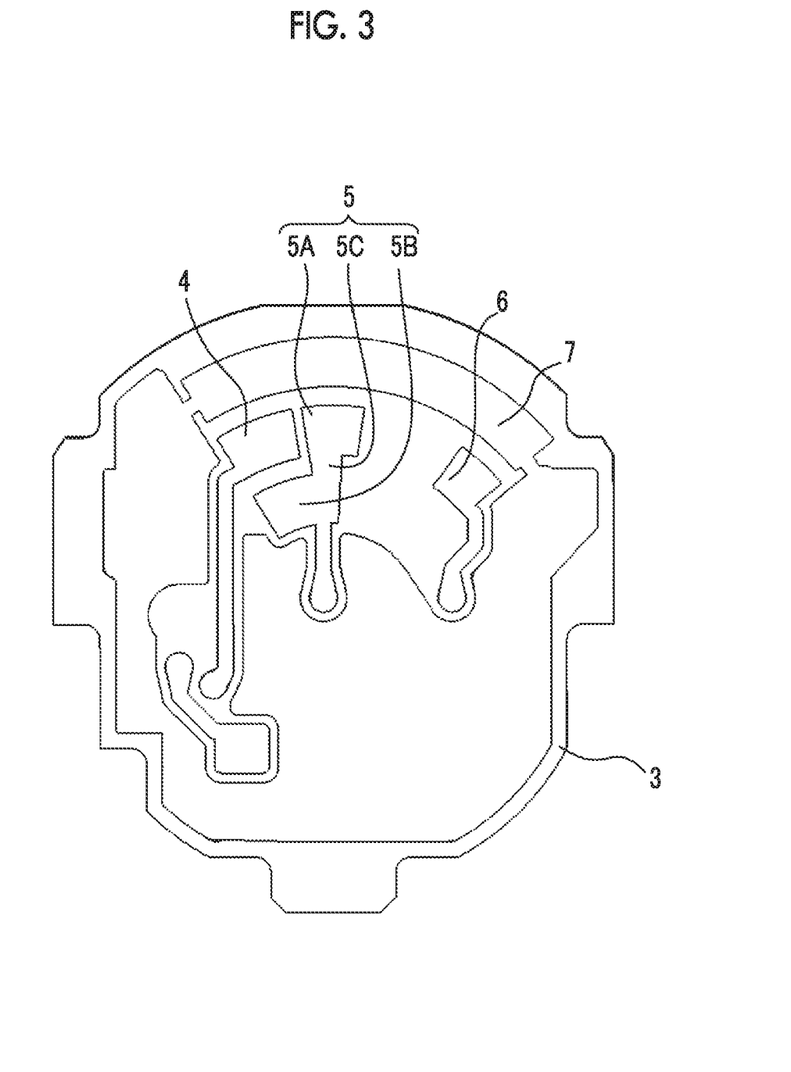
FIG. 3 is an enlarged perspective view showing a disposition state of electrode patterns on the substrate.
Figure 4:
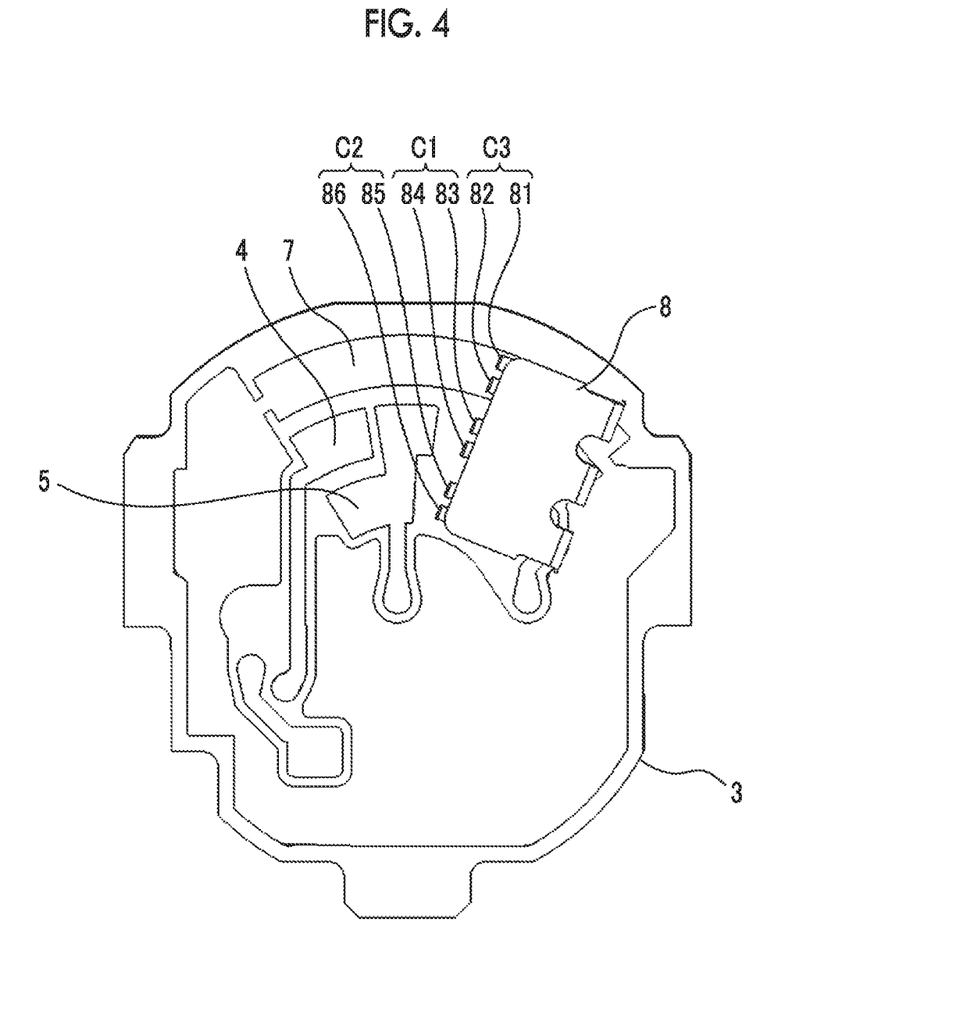
FIG. 4 is an enlarged perspective view showing a disposition state of the slide electrode on the substrate.

FIG. 1 is an external perspective view of a stalk switch 1 on which a rotary input device according to the present embodiment is mounted. FIG. 2 shows main portions (substrate 3 and slide electrode 8) of the rotary input device disposed inside the stalk switch 1, and is an enlarged exploded perspective view showing a state where a rotary member (rotary operation knob) 2 is removed. FIG. 3 is an enlarged perspective view showing a disposition state of a plurality of electrode patterns (4, 5, 6 and 7) formed on the substrate 3. FIG. 4 is an enlarged perspective view showing a disposition state of the slide electrode 8 on the substrate 3.

The stalk switch 1 is an input device which is disposed in the vicinity of a steering of an automobile or the like. The stalk switch 1 includes a switch portion (not shown) which generates a control signal of a direction indicator, a wiper, or the like according to a tilting operation of a rod-shaped stalk switch body 1A, and a rotary input device which is provided in the vicinity of the distal end of the stalk switch body 1A. The rotary input device generates a control signal of a head lamp or a park lamp according to a rotary input operation of the rotary member 2. The rotary input device has a sufficiently small diameter to be held by fingers of a driver of an automobile such that the rotary input device can be rotated, and components thereof also have small sizes.

As shown in FIG. 2, the substrate 3 of the rotary input device is incorporated into the distal end side of the stalk switch body 1A. The plurality of electrode patterns (4, 5, 6, and 7) are formed on the substrate 3. In following descriptions, the electrode pattern 4 may be referred to as a "first electrode pattern 4", the electrode pattern 5 may be referred to as a "second electrode pattern 5", the electrode pattern 6 may be referred to as a "third electrode pattern 6", and the electrode pattern 7 may be referred to as a "ground electrode pattern 7". In addition, the electrode patterns 4, 5, 6, and 7 are not distinguished, and may be referred to the "electrode patterns".

Moreover, the rotary member 2 which is rotatably mounted on the stalk switch body 1A and the slide electrode 8 which is held by the rotary member 2 are incorporated into the distal end side of the stalk switch body 1A. If the rotary member 2 is rotated according to the rotation input operation, the slide electrode 8 rotates relative to the substrate 3 according to the rotation.

The slide electrode 8 includes a plurality of claw-shaped contacts (81 to 86) which slide on the plurality of electrode patterns (4, 5, 6, and 7) of the substrate 3. In the example of FIG. 4, the plurality of contacts (81 to 86) are linearly arranged in a radial direction with respect to the rotation center of the rotary member 2. If the slide electrode 8 rotates relative to the substrate 3 according to the rotation input operation of the rotary member 2, the plurality of contacts (81 to 86) slide on the electrode patterns. The contacts 81 and 82 slide on the ground electrode pattern 7, the contacts 83 and 84 slide on the first electrode pattern 4 and the third electrode pattern 6, and the contacts 85 and 86 slide on the second electrode pattern 5. According to the rotation of the rotary member 2, connection states (conduction/non-conduction) between the plurality of contacts (81 to 86) and the plurality of electrode patterns (4, 5, 6, and 7) are switched. In the following descriptions, the contacts 83 and 84 may be referred to as a "first contact C1", the contacts 85 and 86 may be referred to as a "second contact C2", and the contacts 81 and 82 may be referred to as a "third contact C3".

Figure 5:
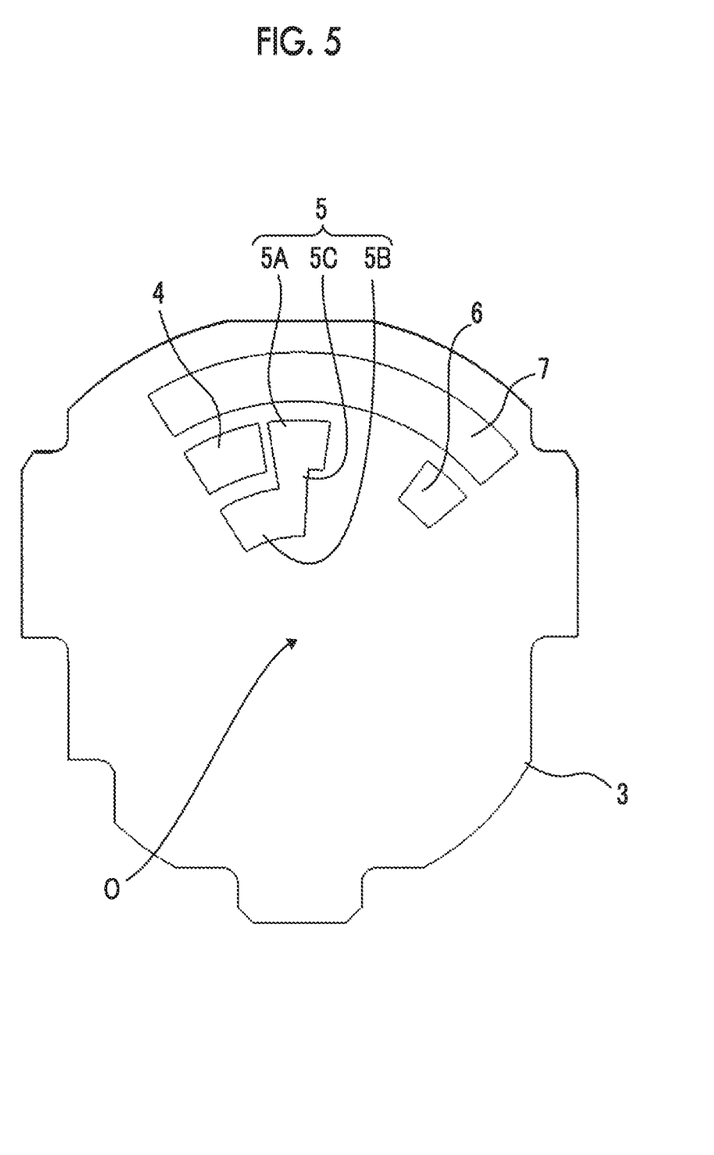
FIG. 5 is a schematic view for explaining configurations of the electrode patterns on the substrate.
Figure 6:
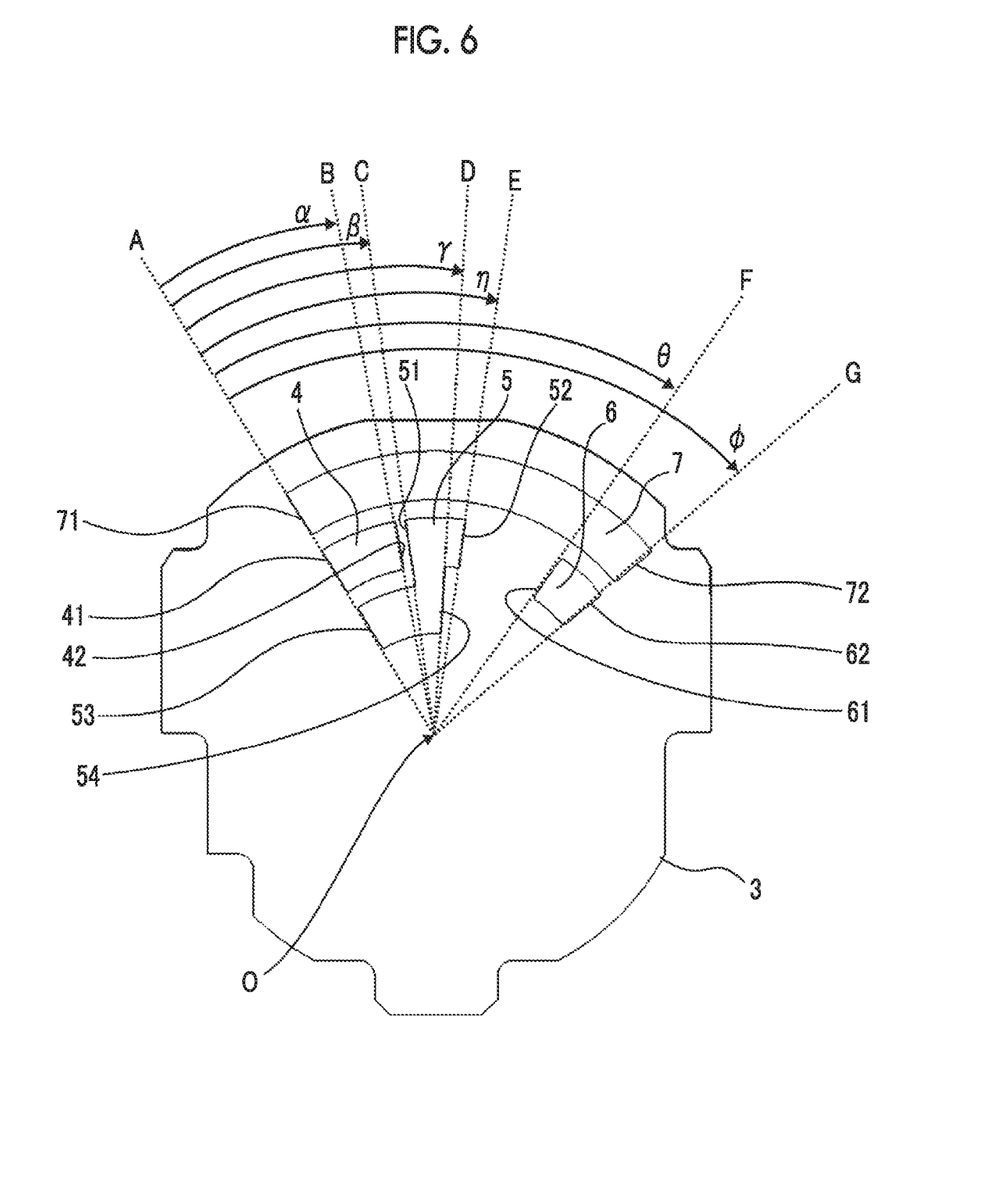
FIG. 6 is a schematic view for explaining a rotation angle when a contact state between the contact of the slide electrode and the electrode pattern is switched.

FIG. 5 is a schematic view for explaining configurations of the electrode patterns formed on the substrate 3, and shows a state where sliding surfaces between the contacts (81 to 86) of the slide electrode 8 and the electrode patterns are extracted. In addition, FIG. 6 is a schematic view for explaining rotation angles of the rotary member 2 when contact states between the contacts (81 to 86) of the slide electrode and the electrode patterns are switched. In FIGS. 5 and 6, a reference numerals "O" indicates a center of a relative rotation between the substrate 3 and the slide electrode 8.

In FIG. 6, reference numerals "α", "β", "γ", "η", "θ", and "φ" indicate rotation angles when the slide electrode 8 (rotary member 2) rotates in the clockwise direction in FIG. 6. In this example, the rotation angle when the contacts (81 to 86) of the slide electrode are positioned in the radial direction indicated by a dotted line OA is defined as a reference rotation angle (zero angle). The rotation angles "α", "β", "γ", "η", "θ", and "φ" are angles when the slide electrode rotates in the clockwise direction in FIG. 6 in this order. In the following descriptions, the rotation angle α may be referred to as a "first rotation angle α", the rotation angle β may be referred to as a "second rotation angle β", the rotation angle γ may be referred to as a "fourth rotation angle γ", and the rotation angle η may be referred to as a "third rotation angle Θ".

In a case where the rotation angle of the slide electrode 8 (rotary member 2) is within a range (a range from the dotted line OA to a dotted line OB in FIG. 6) from the reference rotation angle (zero angle) to the first rotation angle α, the first electrode pattern 4 is connected to the slide electrode 8 via the first contact C1. In addition, the first electrode pattern 4 is disconnected from the slide electrode 8 in a case where the rotation angle is within a range (a range from the dotted line OB to a dotted line OG in FIG. 6) in which the slide electrode further rotates in the clockwise direction in FIG. 6 from the first rotation angle α.

In the example of FIGS. 5 and 6, the first electrode pattern 4 includes a sliding surface between the first contact C1 and the first electrode pattern 4 which is formed in an arc shape with respect to the rotation center O. The sliding surface includes end edges 41 and 42 on both sides in the circumferential direction thereof. The end edge 41 is positioned at the first contact C1 in a case where the rotation angle is the reference rotation angle (zero angle), and the end edge 42 is positioned at the first contact C1 in a case where the rotation angle is the first rotation angle α. The end edge 42 forms a "first edge portion" at which a contact state (contact/non-contact) between the first contact C1 and the first electrode pattern is switched in a case where the rotation angle is the first rotation angle α.

The second electrode pattern 5 is connected to the slide electrode 8 via the second contact C2 which is closer to the rotation center O than the first contact C1 in a case where the rotation angle of the slide electrode 8 (rotary member 2) is within a range (a range from the dotted line OA to a dotted line OD in FIG. 6) from the reference rotation angle (zero angle) to the fourth rotation angle γ (γ>α). In addition, in a case where the rotation angle is within a range (a range from the dotted line OC to a dotted line OE in FIG. 6) from the second rotation angle β (γ>β>α) to the third rotation angle η(η>γ), the second electrode pattern 5 is connected to the slide electrode 8 via the first contact C1. Accordingly, in a case where the rotation angle is within a range (a range from the dotted line OC to a dotted line OD in FIG. 6) from the second rotation angle β to the fourth rotation angle γ, the second electrode pattern 5 is connected to both the first contact C1 and the second contact C2. In addition, in a case where the rotation angle is within a range (a range from the dotted line OE to the dotted line OG in FIG. 6) in which the slide electrode rotates in the clockwise direction in FIG. 6 from the third rotation angle η, the second electrode pattern 5 is disconnected from the slide electrode 8.

In the example of FIGS. 5 and 6, the second electrode pattern 5 includes a first electrode portion 5A having a sliding surface between the first contact C1 and the first electrode portion 5A which is formed in an arc shape with respect to the rotation center O, a second electrode portion 5B having a sliding surface between the second contact C2 and the second electrode portion 5B which is formed in an arc shape with respect to the rotation center O, and a connection portion 5C which electrically connect the first electrode portion 5A and the second electrode portion 5B.

The sliding surface of the first electrode portion 5A includes end edges 51 and 52 on both sides in the circumferential direction thereof. The end edge 51 is positioned at the first contact C1 in a case where the rotation angle is the second rotation angle β, and the end edge 52 is positioned at the first contact C1 in a case where the rotation angle is the third rotation angle η. The end edge 51 forms a "second edge portion" at which a contact state (contact/non-contact) between the first contact C1 and the second electrode pattern is switched in a case where the rotation angle is the second rotation angle β. The end edge 52 forms a "third edge portion" at which a contact state (contact/non-contact) between the first contact C1 and the second electrode pattern is switched in a case where the rotation angle is the third rotation angle η.

The sliding surface of the second electrode portion 5B includes end edges 53 and 54 on both sides in the circumferential direction thereof. The end edge 53 is positioned at the second contact C2 in a case where the rotation angle is the reference rotation angle (zero angle), and the end edge 54 is positioned at the second contact C2 in a case where the rotation angle is the fourth rotation angle γ. The end edge 54 forms a "fourth edge portion" at which a contact state (contact/non-contact) between the second contact C2 and the second electrode pattern is switched in a case where the rotation angle is the fourth rotation angle γ.

In a case where the rotation angle of the slide electrode 8 (rotary member 2) is within a range (a range from the dotted line OF to the dotted line OG in FIG. 6) from the rotation angle θ to the rotation angle φ, the third electrode pattern 6 is connected to the slide electrode 8 via the first contact C1.

In the example of FIGS. 5 and 6, the third electrode pattern 6 includes a sliding surface between the first contact C1 and the third electrode pattern 6 which is formed in an arc shape with respect to the rotation center O. The sliding surface includes end edges 61 and 62 on both sides in the circumferential direction thereof. The end edge 61 is positioned at the first contact C1 in a case where the rotation angle is the rotation angle θ, and the end edge 62 is positioned at the first contact C1 in a case where the rotation angle is the rotation angle φ. The end edge 61 forms a switching edge portion at which a contact state (contact/non-contact) between the first contact C1 and the third electrode pattern is switched in a case where the rotation angle is the rotation angle θ.

The ground electrode pattern 7 is an electrode which is connected to the ground, and is connected to the slide electrode 8 via the third contact C3 positioned farther away from the rotation center than the first contact C1 between the initial rotation angle (reference rotation angle) to the final rotation angle φ (within a range from the dotted line OA to the dotted line OG in FIG. 6). The ground electrode pattern 7 includes the sliding surface between the third contact C3 and the ground electrode pattern 7 which is formed in an arc shape with respect to the rotation center O.

Figure 7:
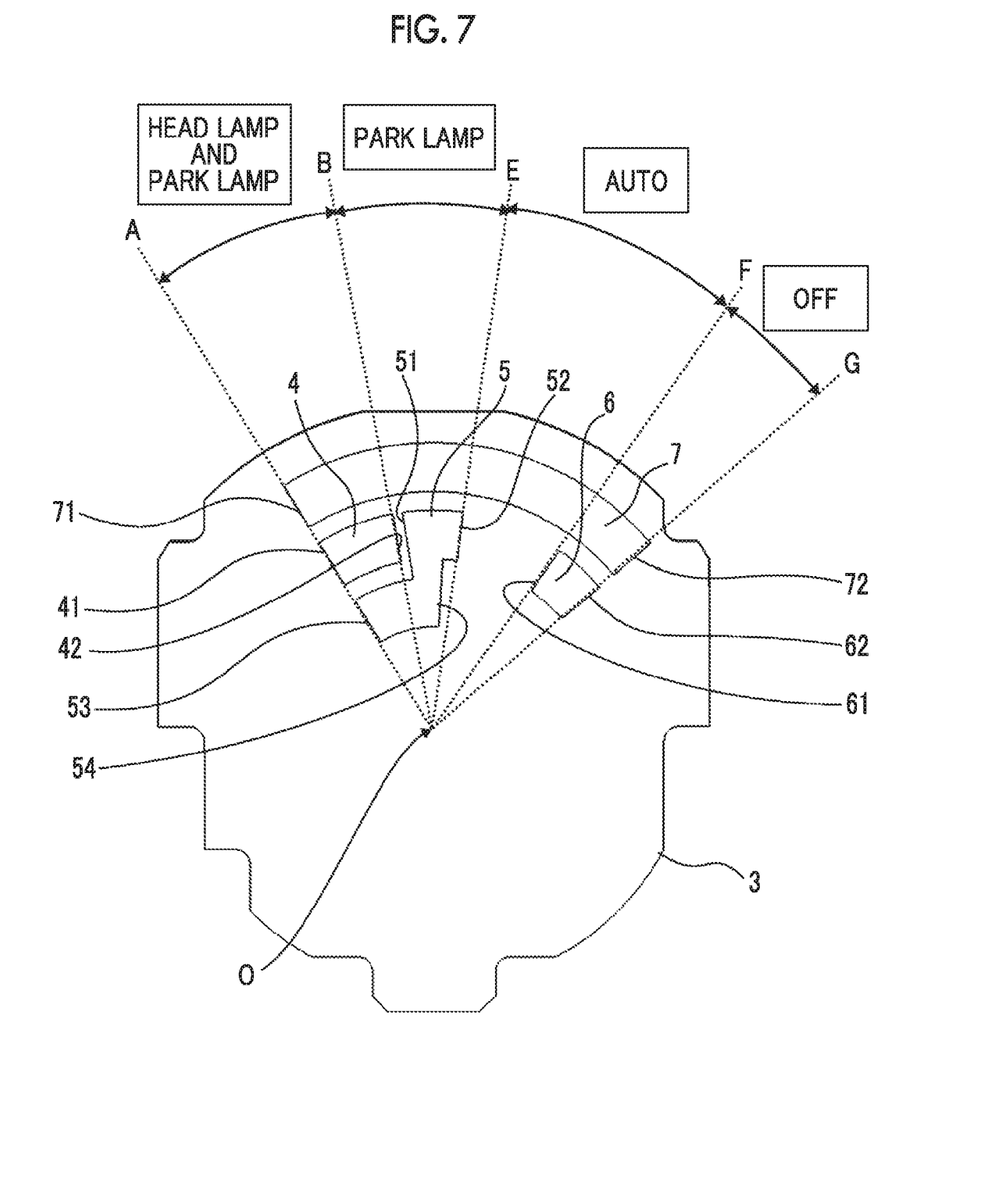
FIG. 7 is a schematic view for explaining the function of each electrode pattern.

FIG. 7 is a schematic view for explaining the functions of electrode patterns (4, 5, 6, and 7) on the substrate 3.

In the case where rotation angle of the slide electrode 8 is within a range from the dotted line OF to the dotted line OG in FIG. 7, the third electrode pattern 6 is connected to the ground via the slide electrode 8. This case becomes an OFF state in which both "HEAD LAMP" and "PARK LAMP" are always turned off.

In the case where the rotation angle of the slide electrode 8 is within a range from the dotted line OE to the dotted line OF in FIG. 7, all the first electrode pattern 4, the second electrode 5, and the third electrode pattern 6 do not conduct with the slide electrode 8. This case becomes an AUTO state in which turning on and turning off of "HEAD LAMP" are automatically performed.

In the case where rotation angle of the slide electrode 8 is within a range from the dotted line OB to the dotted line OE in FIG. 7, only the second electrode pattern 5 is connected to the ground via the slide electrode 8. In this case, only "PARK LAMP" is turned on.

In the case where rotation angle of the slide electrode 8 is within a range from the dotted line OA to the dotted line OB in FIG. 7, both the first electrode pattern 4 and the second electrode pattern 5 are connected to the ground via the slide electrode 8. In this case, both "HEAD LAMP" and "PARK LAMP" are turned on.

FIGS. 8A to 8D are equivalent circuit diagrams for explaining the functions of the electrode patterns (4, 5, 6, and 7) disposed on the substrate 3.

Figure 8A:
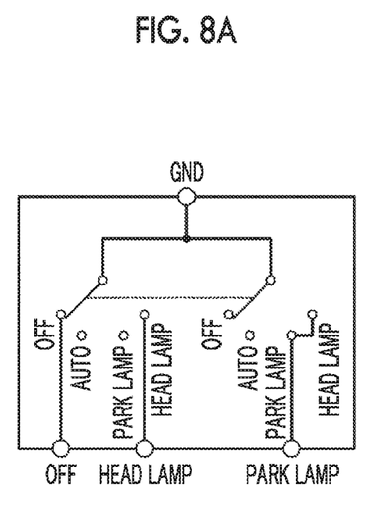

In the case where the rotation angle of the slide electrode 8 is within a range from the dotted line OF to the dotted line OG in FIG. 7, as shown in FIG. 8A, a control terminal for selecting an OFF state is connected to the ground via the third electrode pattern 6 and the slide electrode 8. Accordingly, the state becomes an OFF state in which both "HEAD LAMP" and "PARK LAMP" are always turned off.

Figure 8B:
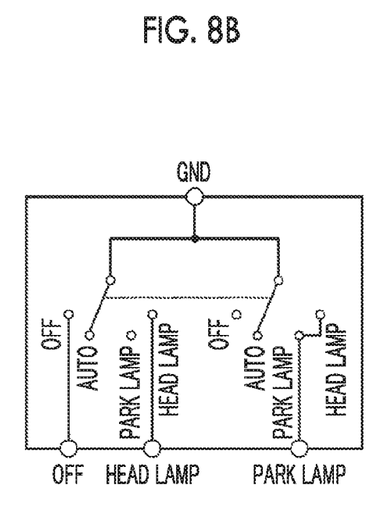

In the case where the rotation angle of the slide electrode 8 is within a range from the dotted line OE to the dotted line OF in FIG. 7, as shown in FIG. 8B, all control terminals are separated from the ground, and in this state, an AUTO state is selected. Accordingly, the state becomes the AUTO state in which turning on and turning off of "HEAD LAMP" are automatically performed according to brightness outside a vehicle.

Figure 8C:
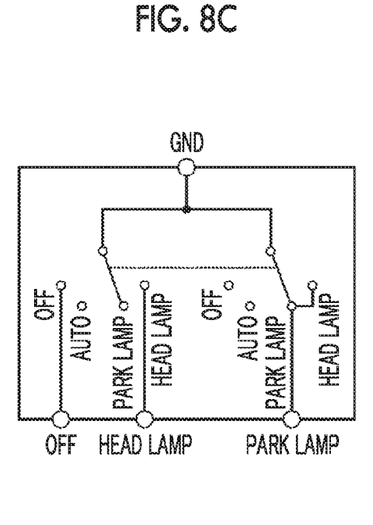

In the case where the rotation angle of the slide electrode 8 is within a range from the dotted line OB to the dotted line OE in FIG. 7, as shown in FIG. 8C, a control terminal for selecting the turning on of "PARK LAMP" is connected to the ground via the second electrode pattern 5 and the slide electrode 8. Accordingly, "PARK LAMP" is turned on.

Figure 8D:
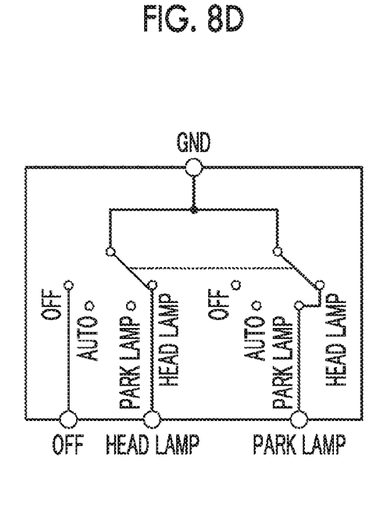

In the case where the rotation angle of the slide electrode 8 is within a range from the dotted line OA to the dotted line OB in FIG. 7, as shown in FIG. 8D, the control terminal for selecting the turning on of "PARK LAMP" is connected to the ground via the second electrode pattern 5 and the slide electrode 8, and the control terminal for selecting the turning on of "HEAD LAMP" is connected to the ground via the first electrode pattern 4 and the slide electrode 8. Accordingly, both "HEAD LAMP" and "PARK LAMP" are turned on.

Next, the operation is described, in which the switching between the ON state and the OFF state of each function is generated according to the rotation input operation.

In the case where the rotation angle of the slide electrode 8 (rotary member 2) is the first rotation angle α, the first contact C1 is positioned on the end edge 42 of the first electrode pattern 4, and the second contact C2 is positioned on the second electrode pattern 5. If the slide electrode 8 rotates in the counterclockwise direction in FIG. 6 from the first rotation angle α, the first electrode pattern 4 comes into contact with the first contact C1 and the second electrode pattern 5 comes into contact with the second contact C2. Accordingly, both "HEAD LAMP" and "PARK LAMP" are turned on. Meanwhile, if the slide electrode 8 rotates in the clockwise direction in FIG. 6 from the first rotation angle α, the first electrode pattern 4 does not come into contact with the first contact C1 and the second electrode pattern 5 comes into contact with the second contact C2. Accordingly, "HEAD LAMP" is turned off, and only "PARK LAMP" is turned on.

In the case where the rotation angle is within the range from the first rotation angle α to the second rotation angle β, only the second contact C2 comes into contact with the second electrode pattern, and in the case where the rotation angle is within the range from the second rotation angle β to the fourth rotation angle γ, both the first contact C1 and the second contact C2 come into contact with the second electrode pattern 5. In addition, in the case where the rotation angle is within the range from the fourth rotation angle γ to the third rotation angle η, only the first contact C1 comes into contact with the second electrode pattern. Accordingly, in the case where the rotation angle is within the range from the first rotation angle α to the third rotation angle η, since the second electrode pattern 5 conducts with the slide electrode 8, the turning-on state of "PARK LAMP" is maintained.

In the case where the rotation angle is the third rotation angle η, the first contact C1 is positioned on the end edge 52 of the second electrode pattern 5. If the slide electrode 8 rotates in the clockwise direction in FIG. 6 from the third rotation angle η, the second electrode pattern 5 and the first contact C1 come into not-contact with each other. Accordingly, since all electrode patterns do not conduct with the slide electrode 8, the state becomes the AUTO state.

As described above, according to the rotary input device of the present embodiment, the connection states (conduction/non-conduction) between the slide electrode 8 and the first electrode pattern 4 are switched with the first rotation angle α as a boundary, and the switching of the connection states is generated by switching the contact states (contact/non-contact) between the first contact C1 and the first electrode pattern 4. In addition, the connection states (conduction/non-conduction) between the slide electrode 8 and the second electrode pattern 5 are switched with the third rotation angle η as a boundary, and the switching of the connection states is generated by switching the contact states (contact/non-contact) between the first contact C1 and the second electrode pattern 5. That is, the contact state between the first contact C1 positioned farther away from the rotation center O than the second contact C2 and the electrode pattern defines the connection state between the slide electrode 8 and the electrode pattern. Accordingly, compared to a case where the contact state between the second contact C2 and the electrode pattern defines the connection state between the slide electrode 8 and the electrode pattern, it is possible to increase accuracy of the rotation angle when the connection states between the slide electrode 8 and the electrode pattern are switched while reducing a level of accuracy required in dimensions or disposition of a component.

In addition, according to the rotary input device of the present embodiment, the ground electrode pattern 7 connected to the ground is connected to the slide electrode via the third contact C3 further separated from the rotation center O than the first contact C1 between the initial rotation angle and the final rotation angle (within the range from the dotted line OA to the dotted line OG in FIG. 6). Accordingly, the first electrode pattern 4 and the second electrode pattern 5 are within the range from the initial rotation angle to the final rotation angle and the range from the range from the rotation center O to the ground electrode pattern 7 in the radial direction. Accordingly, the ground electrode pattern 7 is disposed on the outer circumferential sides of the first electrode pattern 4 and the second electrode pattern 5, and it is possible to easily shield the first electrode pattern 4 and the second electrode pattern 5 from electromagnetic noise or electrostatic discharge from the outside. Accordingly, it is possible to decrease influences due to electromagnetic noise or electrostatic discharge. In addition, since it is not necessary to provide a separate shield on the outer circumferential sides of the first electrode pattern 4 and the second electrode pattern 5, it is possible to decrease the size of the device, and the rotary input device of the present invention can be applied to the stalk switch 1 including a tubular main body having a small diameter.

The present invention can be applied to a combination switch such as a turn signal for a vehicle or a wiper, or various electronic components.

It should be understood by those skilled in the art that various modifications, combinations, sub-combinations and alterations may occur depending on design requirements and other factors insofar as they are within the scope of the appended claims of the equivalents thereof.

What is claimed is:

1. A rotary input device, comprising:
a substrate;
a plurality of electrode patterns formed on the substrate;
a rotary member configured to rotate relative to the substrate according to a rotation input operation; and
a slide electrode held by the rotary member, the slide electrode including a plurality of contacts configured to slide on the plurality of electrode patterns, a state of connection between the plurality of contacts of the slide electrode and the plurality of electrode patterns switching in accordance with a rotation of the rotary member, the plurality of contacts including a first contact, and a second contact disposed closer to a rotation center of the rotary member than the first contact,
wherein the plurality of electrode patterns include:
a first electrode pattern configured to be connected to the slide electrode via the first contact when a rotation angle of the rotary member is within a first range from a reference rotation angle to a first rotation angle in a predetermined direction, the first electrode pattern being configured to be disconnected from the slide electrode when the rotation angle is over the first range as the rotary member further rotates beyond the first rotation angle in the predetermined direction, and
a second electrode pattern configured to be connected to the slide electrode via the second contact when the rotation angle of the rotary member is within a second range from the reference rotation angle to a second rotation angle in the predetermined direction, the second rotation angle being greater than the first rotation angle, the second electrode pattern being configured to be connected to the slide electrode via the first contact when the rotation angle is within a third range from the second rotation angle to a third rotation angle in the predetermined direction, the third rotation angle being greater than the second rotation angle, and the second electrode pattern being further configured to be disconnected from the slide electrode when the rotation angle is over the third range as the rotary member further rotates beyond the third rotation angle in the predetermined direction.

2. The rotary input device according to claim 1, wherein the second electrode pattern becomes disconnected from the second contact when the rotation angle of the rotary member in the predetermined direction is greater than a fourth rotation angle between the second rotation angle and the third rotation angle.

3. The rotary input device according to claim 2, wherein the first electrode pattern includes:
a first edge portion corresponding to the first rotation angle at which a contact state between the first electrode pattern and the first contact is switched, and
wherein the second electrode pattern includes,
a second edge portion corresponding to the second rotation angle at which a contact state between the second electrode pattern and the first contact is switched;
a third edge portion corresponding to the third rotation angle at which a contact state between the second electrode pattern and the first contact is switched; and
a fourth edge portion corresponding to the fourth rotation angle at which a contact state between the second electrode pattern and the second contact is switched.

4. The rotary input device according to claim 3, wherein the first electrode pattern includes:
a first sliding surface for the first contact, the first sliding surface being formed in an arc shape around the rotation center, and having the first edge portion at an end thereof in a circumferential direction, and
wherein the second electrode pattern includes:
a first electrode portion having a second sliding surface for the first contact, the second sliding surface being formed in an arc shape around the rotation center, and having the second edge portion at one end thereof and the third edge portion at another end thereof in the circumferential direction;

a second electrode portion having a third sliding surface for the second contact, the third sliding surface being formed in an arc shape around the rotation center, and having the fourth edge portion at an end thereof in the circumferential direction; and a connection portion electrically connecting the first electrode portion and the second electrode portion.

5. The rotary input device according to claim 1, wherein the plurality of electrode patterns further include:

a ground electrode pattern configured to be connected to the slide electrode via a third contact between an initial rotation angle and a final rotation angle of the rotary member, the third contact being farther away from the rotation center than the first contact among the plurality of contacts.

* * * * *